United States Patent [19]  
Snodgrass

[11] 3,884,132  
[45] May 20, 1975

[54] MAGNETICALLY LOCATED SCORING DIE MATRIX

[75] Inventor: Frank M. Snodgrass, Martinsburg, W. Va.

[73] Assignee: Channel Creasing Matrix, Inc., Martinsburg, W. Va.

[22] Filed: Jan. 11, 1974

[21] Appl. No.: 432,500

[52] U.S. Cl............. 93/59 MT; 76/107 C; 93/58.3; 93/59 MT; 161/158; 161/167; 161/216; 161/406; 161/411
[51] Int. Cl........................... B32b 3/00; B31b 1/44
[58] Field of Search.......... 93/59 MT, 58.3, 58.5 T; 76/107 C; 161/69, 116, 119, 139, 162, 167, 216, 406, 100

[56] References Cited
UNITED STATES PATENTS

| | | | |
|---|---|---|---|
| 2,765,716 | 10/1956 | Anderson | 93/58.5 T |
| 3,111,728 | 11/1963 | Alderfer | 20/69 |
| 3,111,735 | 11/1963 | Ellis | 24/201 |
| 3,147,176 | 9/1964 | Haslam | 161/39 |
| 3,526,566 | 9/1970 | McIlvain et al. | 161/123 |
| 3,687,792 | 8/1972 | Ruff | 161/119 X |
| 3,745,056 | 7/1973 | Jackson | 161/119 X |

Primary Examiner—George F. Lesmes  
Assistant Examiner—Alan T. McDonald  
Attorney, Agent, or Firm—Darby & Darby

[57] ABSTRACT

A die set comprising a creasing rule and a matrix precisely alignable on a platen and an opposed cutting plate respectively for scoring or creasing card-like material in the manufacture of carton blanks. Either one of the die members has a ferromagnetic element encapsulated in it while the other die member has a similarly associated field-creating magnet element. To achieve precise alignment of the matrix and rule the matrix with magnetically coupled rule is placed on the platen, which is advanced towards the cutting plate until a pressure-sensitive adhesive provided on the base of the matrix contacts the surface of the cutting plate. Upon separation of the platen the matrix adheres to the cutting plate and separates from the rule which remains on the platen in position for mating with the matrix.

7 Claims, 6 Drawing Figures

PATENTED MAY 20 1975  3,884,132
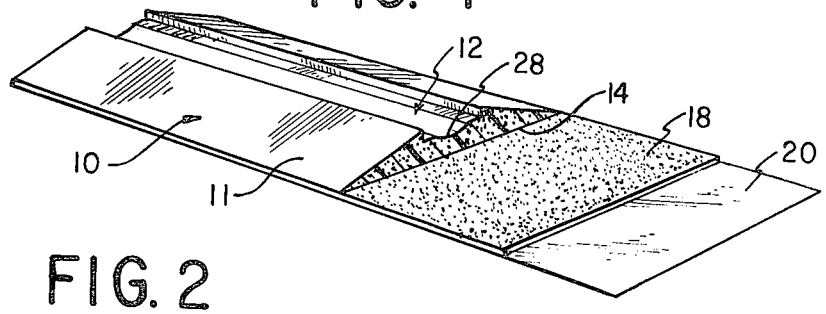
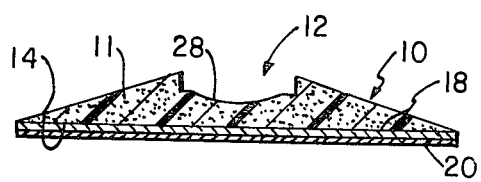
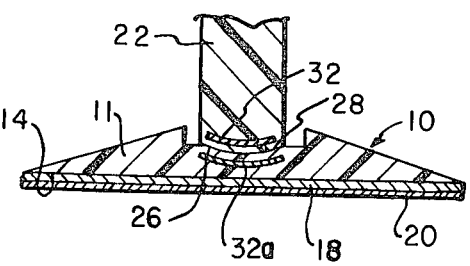
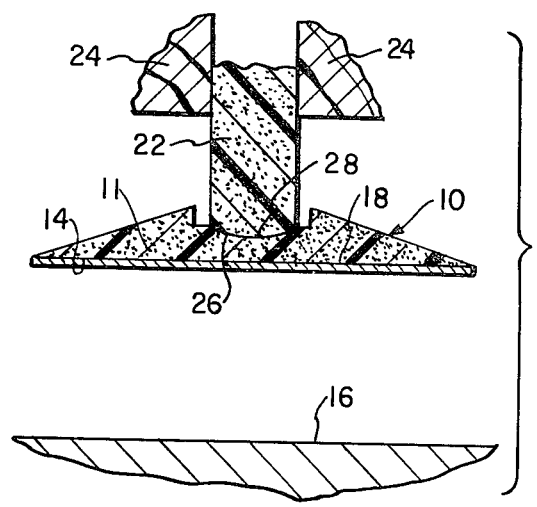
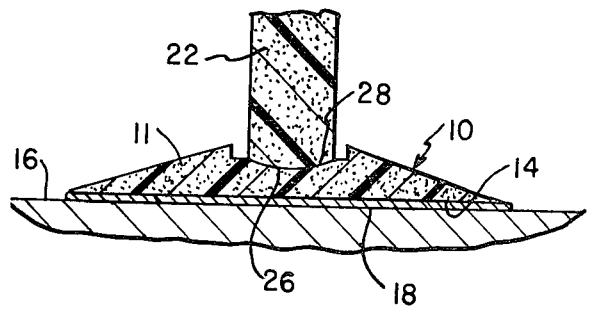
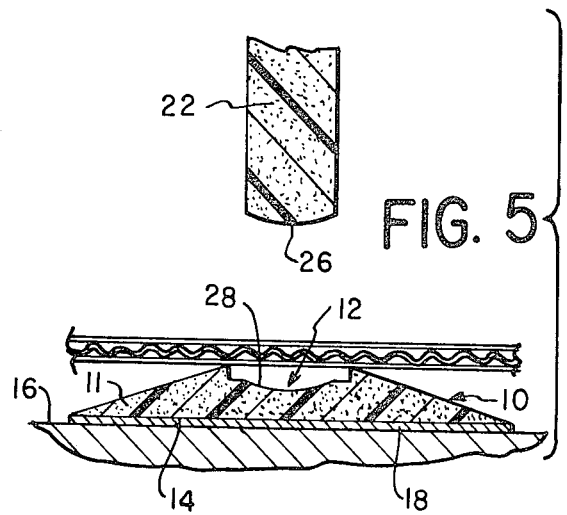

MAGNETICALLY LOCATED SCORING DIE MATRIX

BACKGROUND OF THE INVENTION

This invention relates generally to die sets for scoring or creasing card-like material and, more particularly, to a die set whose elements are self-locating in a precisely aligned relationship on respective press members.

Die sets for creasing or scoring cardboard blanks along predetermined fold lines to form cartons and the like are well known. The die set usually includes a rigid member which serves as a creasing rule mounted in a press platen and a matrix affixed to an opposed cutting plate which comprises an elongated strip having a channel longitudinally formed along its length. The blank material is positioned on the cutting plate resting on the matrix. As the rule is advanced towards the cutting plate, its edge creases or scores the blank by urging the underlying portion of the card material into the matrix channel which is located directly beneath it.

As seen from the above, it is important that the matrix channel be precisely aligned with the creasing edge of the rule. In the past, one way of obtaining an accurate alignment has been to provide the matrix with a locating unit releasably fastened to it. The locator-matrix assembly was fastened over the creasing edge of the rule and the rule advanced toward the cutting plate until a pressure-sensitive adhesive tape provided on the base of the matrix became affixed to the cutting plate. As the result withdrew from the cutting plate, the creasing edge of the rule separated from the locator-matrix assembly. The locator unit would then be peeled off from the matrix thereby leaving the matrix affixed to the cutting plate in aligned relationship with the rule.

Several significant shortcomings are found in this type of arrangement. In most cases, the locator unit, once disassociated from the matrix, cannot be refastened to it. Thus, once separated from its locator unit the matrix becomes useless since it cannot be precisely located on the cutting plate. Similarly, the locator unit must be discarded after a single use. The fact that both the locator and the matrix of the prior art die sets can be used only once results in the manufacture of creased blanks being more expensive than it might otherwise be. Further, the prior apparatus requires extra time to be spent in joining the locator unit to the matrix. Of course, the manufacture of the locator unit results in extra cost.

SUMMARY OF THE INVENTION

Accordingly, one object of this invention is to provide a new and improved self-aligning matrix for use in creasing or scoring carton blanks or the like.

Another object of the invention is the provision of a new and improved self-locating creasing matrix which does not rely upon a separate locator unit to achieve precise alignment with the creasing rule.

Still another object of the present invention is to provide a new and improved self-locating matrix which may be used more than one time.

A further object of the invention is to provide a new and improved self-locating creasing matrix which is magnetically coupled to the rule during placement of the matrix on the cutting plate.

Briefly, in accordance with a preferred embodiment of this invention, these and other objects are obtained by associating a ferromagnetic element with each of the die members, i.e., with both the matrix and the creasing rule. At least one of these elements is magnetized in order to create a magnetic field which exerts an attractive force on the other element. Thus, the matrix may be magnetically coupled to the creasing rule during the matrix locating procedure, which is substantially the same as described above in connection with the prior art structure.

DESCRIPTION OF THE DRAWINGS

A more complete appreciation of the invention and many of the attendant advantages thereof will be readily appreciated by reference to the following detailed description when considered in connection with the accompanying drawings in which:

FIG. 1 is a perspective view illustrating the matrix according to the present invention;

FIG. 2 is an end view in section of the matrix shown in FIG. 1;

FIG. 3 is an end view in section of the matrix associated with a creasing rule during the matrix placement procedure;

FIG. 4 is an end sectional view similar to FIG. 3 showing the rule about to press the matrix against the cutting plate;

FIG. 5 is a front sectional view similar to FIG. 3 showing the rule withdrawn from the positioned matrix; and FIG. 6 is a front sectional view of a different embodiment of the rule and matrix combination.

DESCRIPTION OF THE PREFERRED EMBODIMENT

Referring now to the figures (where like reference numerals designate identical or corresponding parts throughout the views) and more particularly to FIG. 1, a creasing matrix, generally denoted as 10, includes an elongate strip 11 of flexible plastic material having a substantially triangular cross-section. A channel 12 is centrally formed longitudinally along the length of matrix strip 11 in the area in which the apex of the triangle would have been. Surface 14 of the matrix comprises the base of the matrix which will be located contiguous with the cutting plate 16 (FIGS. 3–5) as will be described below. Of course, it is understood that the matrix may have cross-sectional shapes other than triangular so long as a channel similar to channel 12 and a relatively broad base similar to base surface 14 of matrix 10 are provided. For example, an elongate flexible matrix having a rectangular cross-section may be used within the scope of the present invention, with a channel formed in its upper surface.

The matrix 10 is preferably formed of an extruded thermoplastic artificial resin material (hereinafter referred to as plastic). Preferred materials include a thermoplastic resin developed by General Electric Company designated as "Noryl" (particularly Noryl 731 or Noryl GFN 3). Another preferred material is known by the trade name Propathane GSE-111, a thermoplastic copolymer material obtained from Imperial Chemical Industries of Great Britain in which propylene is the dominant monomer. However, it is understood that other plastic materials such as polyvinyl chloride and nylon might be used to form the matrix.

During the extrusion process, a ferromagnetic material is encapsulated within the body of the matrix by well known extrusion techniques. Preferably, the ferromagnetic material comprises an element which extends continuously along the length of the matrix in the vicinity of channel 12, although a string of closely spaced separate elements may be used. In the embodiment shown in FIGS. 1 through 5, the ferromagnetic element comprises iron oxide particles interspersed along and encapsulated within the matrix. However, it is understood that these particles may either extend continuously along the length of the matrix or be periodically positioned at predetermined intervals along its length. As discussed below, these particles may be permanently magnetized so as to exert a magnetic field which extends at least to the area immediately surrounding the matrix. Alternatively, a ferromagnetic element associated with the creasing rule may be magnetized in lieu of the element or material disposed within the matrix.

A double-faced pressure-sensitive adhesive tape 18 is provided on base 14 of matrix 10. A protective cover 20 such as a strip of silicone-coated paper normally overlies the outer surface of the adhesive tape in order to prevent extraneous matter from coming into contact with it prior to locating the matrix on the cutting plate.

Referring to FIGS. 3 through 5, the creasing or scoring rule 22 comprises a rigid plate or strip held edgewise in place on a press platen by die blocks 24 (FIG. 3) usually formed of wood. The creasing rule 22 is fixed to and moves with the platen with which it is associated in a vertical direction as seen in FIG. 3. In the past, creasing rules have been formed of steel in order to withstand relatively large pressures during the scoring of the blanks (sometimes reaching two hundred pounds per inch of surface). Such a steel rule may be used in accordance with this invention without any modification since the rule itself comprises a ferromagnetic element. However, it has been found equally practicable to substitute a polymer composition for the steel and encapsulate a ferromagnetic element or material within the rule. Such a polymer composition may be "Noryl," discussed above, nylon or rigid polyvinylchloride, among others. In practice, it has been found that a creasing rule formed of Noryl performs satisfactorily.

When formed of plastic material, the creasing rule is extruded with a ferromagnetic element or material encapsulated in it. In the present embodiment, magnetic iron oxide particles similar to the ones encapsulated with matrix 10 are used. It can now be seen that the magnetic particles in either the matrix or the rule must be energized to exert an attractive force on the particles encapsulated within the other die member. In the present embodiment, the particles encapsulated within the matrix are magnetized.

The creasing edge 26 of the creasing rule preferably has a concave cross-section while the lower channel surface 28 is formed with a corresponding convex cross-section. Thus, the creasing edge of the rule and the lower channel surface matingly conform with each other upon coupling the matrix to the rule as described immediately below.

The procedure for precisely locating the matrix strip on the cutting plate so that the matrix channel is precisely aligned with the creasing edge of the rule will now be described. The matrix 10 is positioned so that the creasing edge rule 22 is positioned within channel 12 of the matrix with the respective surfaces 26 and 28 mating with each other. The attractive magnetic force between the ferromagnetic elements encapsulated within the respective die members couples the matrix to the rule as shown in FIG. 3. The paper strip 20 is then removed from the adhesive tape 18 and the matrix-rule set is positioned between the blocks 24 of the platen. The rule, together with the matrix is advanced towards the cutting plate 16 by advancing the platen until the adhesive-covered base of the matrix is pressed against the cutting plate, affixing the matrix to the cutting plate (FIG. 4). The platen and rule are then withdrawn, and since the adhesive bond between the matrix and the cutting plate is stronger than the magnetic bond between the rule and the matrix, the rule separates from the matrix (FIG. 5). Thus, the matrix has been located with the channel 12 in precise alignment with the creasing edge of rule 22. A cardboard blank 30 (FIG. 5) is then interposed between the die members for subsequent creasing by advancing the platen.

As stated above, magnetic elements other than iron oxide particles may be used. For example, referring to FIG. 6, ferromagnetic shims 32 may be encapsulated within the creasing rule and matrix. Again, one (or both) of these elements is magnetized so as to exert an attractive force on the other element in order to couple the die members. Besides the shims and particles, ferromagnetic foil strips or wires (either continuous or in a sequence of separated elements), among other things, may be used in accordance with the present invention.

Additionally, the ferromagnetic elements need not be encapsulated in each element but may be provided externally thereof. For example, a steel shim may be fastened over the lower surface 28 of matrix channel 12 within the scope of the present invention.

Obviously, numerous modifications and variations of the present invention are possible in the light of the above teachings. It is therefore to be understood that within the scope of the appended claims the invention may be practiced otherwise than is specifically described herein.

What is claimed is:

1. A creasing matrix for use in cooperation with a creasing rule to form a crease in a blank of card-like material comprising an elongate element having an upwardly facing side and a downwardly facing side, said upwardly facing side defining a longitudinal channel along said element and said downwardly facing side comprising a substantially planar surface, a pressure-sensitive adhesive layer contiguous with said planar surface, and a magnetic assembly integrally associated with said elongate element along the length thereof.

2. A creasing matrix as recited in claim 1 wherein said magnetic assembly comprises a magnet.

3. A creasing matrix as recited in claim 1 wherein said magnetic assembly comprises an elongate shim formed of ferromagnetic material.

4. A creasing matrix as recited in claim 1 wherein said magnetic assembly comprises particulate matter formed of ferromagnetic material.

5. A creasing matrix as recited in claim 4 wherein said particulate matter extends continuously along the length of said elongate element adjacent said channel.

6. A creasing matrix as recited in claim 5 wherein said particulate matter comprises iron oxide particles.

7. A creasing matrix as recited in claim 1 wherein said magnetic assembly is embedded within said elongate matrix element.

* * * * *